3,835,004
ACCELERATION OF CROSSLINKING IN BY POLYOLEFINS APPLIED RADIATION IN A GASEOUS ATMOSPHERE OF FLUORINE-CONTAINING MONOMER AND ACETYLENE
Tsutomu Kagiya, Kyoto, and Hiroshi Mitsui and Fumio Hosoi, Takasaki, Japan, assignors to Japan Atomic Energy Research Institute, Tokyo, Japan
No Drawing. Filed July 17, 1972, Ser. No. 272,151
Claims priority, application Japan, Feb. 5, 1971, 46/9,595; July 19, 1971, 46/53,731; Aug. 19, 1971, 46/63,203; Sept. 9, 1971, 46/69,839
Int. Cl. B01j 1/10, 1/12
U.S. Cl. 204—159.17                      18 Claims

ABSTRACT OF THE DISCLOSURE

An olefine polymer is advantageously cross-linked by means of an ionizing radiation in the presence of an ethylenically unsaturated halocarbon and a monomer selected from acetylene and 1,3-butadiene. Thus, an olefine polymer is provided with improved mechanical, chemical, thermal properties and the like.

BACKGROUND OF THE INVENTION

This invention relates to a process for modifying or improving properties of olefine polymers by cross-linking, utilizing irradiation with ionizing radiations, and a modified olefine polymer thereby.

It is well known that molecules of olefine polymers are cross-linked when they are irradiated with an ionizing radiation. Such modification or improvement of olefine polymers by cross-linking is effected by treatment over a short period of time at a low temperature. In such a treatment, however, severance (degradation) of main chains of high polymer molecules takes place simultaneously with cross-linking. Thus, the ratio of formation of cross-linking to severance of main chains of polymer molecules—that is, the cross-linking yield—is low, and severance of main chains of the polymer molecules degrades mechanical properties of the polymer materials. These disadvantages are inherent in the cross-linking treatment by means of an ionizing radiation.

Prior to this invention, we found, in a research project pertaining to unit reaction in radiation copolymerizations, that activated polymer radicals are very liable to react with ethylenically unsaturated halocarbon. Also we found that, when polyethylene is irradiated with an ionizing radiation in the presence of acetylene, cross-linking of polyethylene proceeds by a chain reaction mechanism and that polyethylene can be cross-linked by irradiation of an extremely small dose of the ionizing radiation (Hiroshi Mitsui, Fumio Hosoya and Tsutomu Kagiya: Promotive effect of acetylene upon cross-linking of polyethylene by gamma radiation, Procedures of the 9th Isotope Conference in Japan, A/RC-8, p. 203 (1969)).

On the basis of these findings we studied further the reaction mechanism in the radiation chain cross-linking of olefine polymers and the reaction between the active polymer radicals and ethylenically unsaturated halocarbons. And we found that when an olefine polymer is irradiated with an ionizing radiation in the co-presence of an ethylenically unsaturated halocarbon and acetylene, cross-linking is multiplicatively or synergetically promoted beyond expectation. And it was recognized that when an olefine polymer is irradiated with an ionizing radiation in the presence of a mixture of an ethylenically unsaturated halocarbon and acetylene, it is cross-linked with a radiation dose remarkably lower than that required when either acetylene or an ethylenically unsaturated halocarbon exists alone, and, of course, far lower than when neither of them exists.

Research was continued in line with this finding, and we have found the same effect is exhibited when an olefine polymer is irradiated with an ionizing radiation in the co-presence of an ethylenically unsaturated halocarbon and 1,3-butadiene. Thus we have completed this invention.

SUMMARY OF THE INVENTION

The object of this invention is to provide a process for obtaining with ease modified or improved olefine polymer materials provided with improved mechanical, chemical and thermal properties by treating said polymers with specific compounds by means of an ionizing radiation, whereby the above-described disadvantages are eliminated. Another object of this invention is to provide thus-modified olefine polymers.

This invention comprises irradiating an olefine polymer with an ionizing radiation in the co-presence of an ethylenically unsaturated halocarbon and acetylene or 1,3-butadiene.

The term "olefine polymer" herein referred to means homopolymers such as polyethylene, polypropylene, polybutene, polyisobutylene, polypentene or polyhexene; copolymers such as ethylene-propylene copolymer, ethylene-vinyl acetate copolymer; graft polymers such as polyethylene or polypropylene grafted with butadiene, vinyl chloride, styrene or tetrafluoroethylene, and mixtures of two or more of the above-mentioned polymeric materials. The olefine polymers to which this invention is applicable further include substituted polyolefines, in which side chains thereof such as hydrogen, methyl, ethyl etc. are substituted with one or more organic or inorganic substituents, and mixtures thereof. The examples of such substituted polyolefines are chlorinated or chlorosulfonated polyolefines such as chlorinated polyethylene, chlorinated polypropylene and chlorosulfonated polyethylene, etc.

The invention of this application is applicable to these polymeric materials in any form, that is, in the form of powder, pellets, strings, plate, bar and others, or in any shaped article, or in the foamed state.

In carrying out the process of this invention, any ionizing radiation can be employed. Specifically speaking, any of electron beams, neutron beams, $\alpha$-rays, $\beta$-rays, $\gamma$-rays, X-rays, ultraviolet light, proton beams, deuteron beams, etc. can be employed. It is an established fact that all these radiations are equally effective in promoting chemical reactions including polymerization reactions. (If necessary, refer to Charlesby's text book and the like.)

The radiation dose required for carrying out the process of this invention is generally in the range of 100 ev. or $10^2$ roentgens to $10^9$ roentgens, especially $10^3$ to $10^8$ roentgens. The suitable dose is determined by considering the species of olefine polymer material employed, mixing ratio of the ethylenically unsaturated halocarbon and acetylene or 1,3-butadiene used and the amount of addition thereof, the pressure and temperature under which irradiation is conducted, the kind of radiation employed, degree of intended modification or improvement of the olefine polymer material, and so forth.

The term "ethylenically unsaturated halocarbon" encompasses monomeric fluoro- or chlorofluorocarbons having an ethylenic double bond such as tetrafluorethylene, chlorotrifluorethylene, hexafluoropropylene, vinylidene fluoride, vinyl fluoride and the like. In other words, the ethylenically unsaturated halocarbon to be employed in this invention is defined as a substitute hydrocarbon having at least one ethylenic double bond, at least one carbon atom constituting each double bond being bonded with at least one fluorine atom, said halocarbon being in gaseous or liquid state under atmospheric pressure and at room temperature. The substituted hydrocarbon can further be substituted with a halogen atom other than fluorine.

DESCRIPTION OF THE PREFERRED EMBODIMENTS

The ethylenically unsaturated halocarbons, acetylene and 1,3-butadiene can be used either in gaseous phase or in liquid phase. Further these substances can be used in the form of a mixture with one or more other gaseous or liquid substances. There is no specific restriction in the mixing ratio of the ethylenically unsaturated halocarbon and acetylene or 1,3-butadiene. An ethylenically unsaturated halocarbon containing a very small amount of acetylene or 1,3-butadiene; or acetylene or 1,3-butadiene containing a very small amount of an ethylenically unsaturated halocarbon is satisfactorily effective, although the content of the ethylenically unsaturated halocarbon in the mixture is generally 1–99 mole percent, and preferably 20–99 mole percent. The mixing ratio of the ethylenically unsaturated halocarbon and the other monomer can easily be determined by those skilled in the art on the basis of the description of the working examples and the technical idea or principle of this invention, and actually it is suitably determined by considering the kind of olefine polymer employed, the amount of mixture added, conditions of cross-linking reaction such as temperature, pressure and the kind of the radiation employed, the desired degree of improvement in the properties of the olefine polymer modified, etc.

The process of this invention can be carried out at room temperature or a temperature lower than room temperature and at atmospheric pressure or a pressure lower than atmospheric pressure by means of an ionizing radiation with satisfactory results. However, cross-linking reactions are accelerated by an increase in reaction temperature and pressure. Therefore it is also advisable to carry out the irradiation of an ionizing radiation at an elevated temperature under pressurization, whereby the required dose of irradation will be reduced.

In carrying out the process of this invention, radical initiators, other cross-linking agents, cross-linking accelerators, etc. which are used in the cross-linking processes of the prior art can optionally be used, in combination if desired, in addition to the employment of an ionizing radiation and the ethylenically unsaturated halocarbon and acetylene and 1,3-butadiene. These agents contribute to promotion of cross-linking.

The mechanism of the reaction in the process of this invention is not yet clearly understood, but it is surmised to be as follows. By the irradiation of an ionizing radiation, high polymer chains of an olefin polymer are turned to free radicals. When acetylene is used, the cross-linking reaction takes place between the thus formed polymer radicals and acetylene, whereby the ethylenically unsaturated halocarbon is involved so as to accelerate the chain cross-linking reaction by irradiation and to extend the length of the chains. In the cases where 1,3-butadiene is employed, the ethylenically unsaturated halocarbon adds to the formed polymer radicals, and 1,3-butadiene adds thereto, thus the chain cross-linking reaction proceeds.

According to this invention, the cross-linking yield is remarkably improved in comparison with the known modification processes for improving properties of the olefine polymers by means of irradiation cross-linking. And polyolefine materials which are markedly improved in mechanical properties, weathering resistance, chemical properties such as resistance to chemicals, thermal properties such as resistance to deformation at elevated temperatures and electrical properties such as dielectric constant, dielectric loss, etc. are obtained.

When the process of this invention is applied to shaped articles of an olefine polymer, the fatal defect of the prior art material that the articles cannot be used at temperatures higher than the molding temperature thereof is overcome. Therefore, it is a remarkable advantage of this invention that the process of this invention can be applied to a much wider range of materials.

Now the invention is explained in detail by way of working examples.

Example 1

A powder polyethylene obtained by gaseous phase polymerization of ethylene by irradiation of gamma rays was placed in a stainless steel reactor and was irradiated with $6.6 \times 10^5$ rads of gamma rays from a cobalt-60 source in the presence of each of the mixtures of acetylene and tetrafluoroethylene the mixing ratios of which are listed in Table 1. The irradiation was conducted under atmospheric pressure.

For the purpose of comparison, the same powder polyethylene was irradiated with $6.6 \times 10^5$ rads of gamma rays from the cobalt-60 source at room temperature, respectively in vacuum of $10^{-4}$ mm. Hg, in the presence of acetylene of atmospheric pressure and in the presence of tetrafluoroethylene of atmospheric pressure.

All the irradiated samples were soaked in boiling xylene for 48 hours for extraction. The thus determined percentage of the insoluble part of the samples, that is, the gel fraction of the samples are given in Table 1.

Table 1 tells that resistance to solvents (gelation) of polyethylene is improved by the irradiation in the presence of either tetrafluoroethylene or acetylene only, but such resistance (gelation) is more remarkably improved by irradiation in the presence of gaseous mixtures of acetylene and tetrafluoroethylene. Also it is learned from Table 1 that with increase in tetrafluoroethylene content in the gaseous mixture, gelation of polyethylene advances. However, it is also apparent from the table that there is no remarkable increase in gelation rate of polyethylene if tetrafluoroethylene content is increased over a certain limit.

In comparison with the cases where polyethylene is irradiated in vacuum or in the presence of tetrafluoroethylene or acetylene only, chemical resistance of polyethylene is increased when it is irradiated in the presence of tetrafluoroethylene or acetylene. But when polyethylene is irradiated in the presence of both tetrafluoroethylene and acetylene, chemical resistance and chemical resistance thereof are remarkably improved.

TABLE 1

| | Atmosphere in which irradiation is conducted | Tetrafluoroethylene content in the mixture (mole percent) | Gel fraction (percent by wt.) |
|---|---|---|---|
| Non-irradiated | | | 0.0 |
| Examples of the invention. | Acetylene plus tetrafluoroethylene. | 16.7 | 66.0 |
| | do | 50.0 | 72.9 |
| | do | 83.3 | 72.9 |
| Comparative examples. | Vacuum | | 22.3 |
| | Acetylene | 0.0 | 59.8 |
| | Tetrafluoroethylene | 100.0 | 42.9 |

Example 2

A film 0.2 mm. in thickness formed from commercially available high density polyethylene pellets was placed in the stainless steel reactor used in Example 1. The reactor was pressurized with respectively one of the gaseous mixtures of acetylene and tetrafluoroethylene as listed in Table 2 at an absolute pressure of 3 kg./cm.$^2$ at 30° C. Thus the film was irradiated with $6.6 \times 10^5$ rads of gamma rays from the cobalt-60 source.

For the purpose of comparison, irradiation was repeated in vacuum of $10^{-4}$ mm. Hg and in the presence of acetylene and tetrafluoroethylene under the absolute pressure of 3 kg./cm.$^2$.

The irradiated samples were tested to determine their gel fractions in the same way as in Example 1 and the results are shown in Table 2.

Table 2 tells that when polyethylene is irradiated in the co-presence of acetylene or tetrafluoroethylene, the gelation of polyethylene is promoted, but when it is irradiated in the presence of a mixture of the two, gelation of polyethylene is far more promoted. Also Table 2 tells that when polyethylene is irradiated in the presence of the mixture of acetylene and tetrafluoroethylene, increase in tetrafluoroethylene content in the mixture contributes to the promotion of gelation of polyethylene, but its increase over a certain limit does not bring about promotion of gelation proportional to the increase.

TABLE 2

|  |  | Tetrafluoroethylene content in the mixture (mole percent) | Gel fraction (percent by wt.) |
|---|---|---|---|
| Non-irradiated | | | 0.0 |
| Examples of the invention. | Acetylene plus tetrafluoroethylene. | 16.7 | 32.1 |
| | do | 50.0 | 44.9 |
| | do | 83.3 | 47.6 |
| Comparative examples. | Vacuum | | 0.0 |
| | Acetylene | 0.0 | 15.1 |
| | Tetrafluoroethylene | 100.0 | 0.0 |

Example 3

A commercially available polyethylene reagent bottle was placed in the stainless steel reactor and was irradiated with 1.6 megarads of gamma rays from a cobalt-60 source at room temperature respectively in vacuum, in the pressure of acetylene of 1 (unit) atmospheric pressure, in the presence of an acetylene-tetrafluoroethylene mixture, the tetrafluoroethylene content of which is 50 mole percent, of 1 atmospheric pressure.

A non-irradiated polyethylene reagent bottle and the samples which had been irradiated in the above-mentioned atmospheres were heated simultaneously in an air bath the temperature of which was maintained at 150° C. The non-irradiated polyethylene bottle collapsed in six minutes and the bottle irradiated in vacuum collapsed in 10 minutes. The bottle irradiated in the acetylene atmosphere was remarkably deformed after 30 minutes. But the bottle irradiated in the acetylene-tetrafluoroethylene mixture remained unchanged in appearance after 30 minutes.

Further, a non-irradiated polyethylene reagent bottle and the other samples which had been irradiated in the above-mentioned atmospheres were heated simultaneously in an air bath the temperature of which was maintained at 180° C. This time, the non-irradiated bottle collapsed in 3 minutes, and the bottle irradiated in vacuum in 4 minutes. The bottle irradiated in the acetylene atmosphere collapsed in 11 minutes. But the bottle irradiated in the acetylenetetrafluoroethylene exhibited no change in appearance even after 15 minutes.

That is to say, the polyethylene bottles which were irradiated in the presence of a mixture of acetylene and tetrafluoroethylene exhibited remarkably improved thermal resistance in comparison with the non-irradiated polyethylene bottles and those which were irradiated in vacuum or in the presence of acetylene.

Example 4

A film 0.2 mm. in thickness formed from commercially available high density polypropylene pellets was placed in the stainless steel reactor used in Example 1. The reactor was pressurized with a mixture of acetylene and tetrafluoroethylene containing 50 mole percent tetrafluoroethylene to an absolute pressure of 3 kg./cm.$^2$ at room temperature. Then the film was irradiated with 4.8 megarads of gamma rays from the cobalt-60 source.

For the purpose of comparison, irradiation treatment was repeated in vacuum of $10^{-4}$ mm. Hg, in an acetylene or tetrafluoroethylene atmosphere of 3 kg./cm.$^2$ (absolute pressure).

The irradiated samples were tested for determining their gel fraction in the same way as in Example 1. The results are shown in Table 3.

The results show that chemical and thermal resistances of polypropylene are remarkably improved by irradiation in the presence of acetylene, but far better chemical and thermal resistances are obtained by irradiation in the presence of a mixture of acetylene and tetrafluoroethylene.

TABLE 3

|  | Atmosphere in which irradiation is conducted | Gel fraction (percent by wt.) |
|---|---|---|
| Non-irradiated | | 0.0 |
| Example of this invention | Acetylene plus tetrafluoroethylene. | 53.6 |
| Comparative examples | Vacuum | 0.0 |
| | Acetylene | 47.4 |
| | Tetrafluoroethylene | 0.0 |

Example 5

A film 0.2 mm. in thickness formed from a commercially available chlorinated polyethylene containing 30% chlorine was placed in the stainless steel reactor used in Example 1. The reactor was filled with a mixture of acetylene and tetrafluoroethylene containing 50 mole percent tetrafluoroethylene of atmospheric pressure. Then the sample was irradiated with 1.6 megarads of gamma rays from the cobalt-60 source.

For the purpose of comparison irradiation treatment was repeated in vacuum of $10^{-4}$ mm. Hg and in the presence of acetylene or tetrafluoroethylene of atmospheric pressure.

The samples were tested for determining gel fractions thereof in the same way as in Example 1. The results are shown in Table 4.

It is learned from Table 4 as well as from other tables that irradiation in the presence of tetrafluoroethylene only does not contribute to improvement of properties of chlorinated polyethylene, but irradiation in the presence of acetylene remarkably improves both chemical and thermal resistance thereof and irradiation in the presence of both acetylene and tetrafluoroethylene improves far more both chemical and thermal resistance.

TABLE 4

|  | Atmosphere in which irradiation is conducted | Gel fraction (percent by wt.) |
|---|---|---|
| Non-irradiated | | 0.0 |
| Example of this invention | Acetylene plus tetrafluoroethylene. | 75.4 |
| Comparative examples | Vacuum | 30.4 |
| | Acetylene | 51.5 |
| | Tetrafluoroethylene | 32.0 |

Example 6

A film 0.2 mm. in thickness formed from commercially available high density polyethylene pellets was placed in the stainless steel reactor. The reactor was pressurized respectively with one of the gaseous mixtures of 1,3-butadiene and tetrafluoroethylene the mixing ratios of which are listed in Table 5 to 3 kg./cm.$^2$ of absolute pressure at 30° C. The samples were irradiated with 1.5 megarads og gamma rays from the cobalt-60 source at a dose rate of $1 \times 10^5$ rads per hour.

For the purpose of comparison the same polyethylene film was placed in the same reactor and was irradiated with 1.5 megarads of gamma rays from the cobalt-60 source at a dose rate of $1 \times 10^5$ rad per hour in vacuum of $10^{-4}$ mm. Hg, and in the presence of 1,3-butadiene or tetrafluoroethylene under 3 kg./cm.$^2$ absolute pressure.

The irradiated samples were soaked in boiling xylene and extracted until they reached constant weight. The percentages of the insoluble portion, that is, gel fraction, of the samples are given in the table 5.

Chemical and thermal resistances are remarkably improved by irradiation in the presence of 1,3-butadiene in comparison with irradiation in vacuum, but by irradiation in the presence of both 1,3-butadiene and tetrafluoroethylene, chemical and thermal resistances of polyethylene are far more improved.

TABLE 5

| | Atmosphere in which irradiation is conducted | Tetrafluoroethylene content in the mixture (mole percent) | Gel fraction (percent by wt.) |
|---|---|---|---|
| Non-irradiated | | | 0.0 |
| Examples of the invention. | 1,3-butadiene plus tetrafluoroethylene. | 50.0 | 25.1 |
| | do | 83.0 | 46.8 |
| | do | 93.3 | 67.3 |
| | do | 97.2 | 42.8 |
| Comparative examples. | Vacuum | | 0.0 |
| | 1,3-butadiene | 0.0 | 20.6 |
| | Tetrafluoroethylene | 100.0 | 0.0 |

Example 7

Powder polyethylene prepared by gamma radiation polymerization in the gaseous phase was placed in a glass ampoule. The ampoule was evacuated to $10^{-4}$ mm. Hg by suction over 1 hour. Thereafter the ampoule was filled with a 1,3-butadiene-tetrafluoroethylene mixture the tetrafluoroethylene content of which is 95 mole percent at the atmospheric pressure and it was sealed by fusion while being cooled with liquid nitrogen. Then the ampoule was warmed to room temperature. The ampoule was irradiated with $6.6 \times 10^5$ rads of gamma rays from the cobalt-60 source at a dose rate of $2 \times 10^5$ rads per hour.

For the purpose of comparison, the same powder polyethylene was placed in glass ampoules. One ampoule was evacuated to $10^{-4}$ mm. Hg by suction for 1 hour, and was sealed while being cooled with liquid nitrogen. Other ampoules were filled with 1,3-butadiene or tetrafluoroethylene of atmospheric pressure and were sealed while being cooled with liquid nitrogen. These ampoules were irradiated in the same way as above.

The gel fractions of each sample was determined by the procedure as explained above, and the results are shown in Table 6.

TABLE 6

| | Atmosphere in which irradiation is conducted | Gel fraction (percent by wt.) |
|---|---|---|
| Non-irradiated | | 0.0 |
| Example of the invention | 1,3-butadiene plus tetrafluoroethylene. | 48.3 |
| Comparative examples | Vacuum | 0.0 |
| | 1,3-butadiene | 6.8 |
| | Tetrafluoroethylene | 0.0 |

Example 8

A film 0.2 mm. in thickness formed from commercially available polypropylene pellets by heating and pressing was placed in the stainless steel reactor and was irradiated with 4.5 megarads of gamma rays from the cobalt-60 source at 30° C. in the presence of 1,3-butadiene-tetrafluoroethylene mixtures the tetrafluoroethylene contents of which are shown in Table 7.

For the purpose of comparison, the irradiation of the polypropylene film as explained above was repeated in vacuum of $10^{-4}$ mm. Hg and in the presence of 1,3-butadiene or tetrafluoroethylene under 3 kg./cm.² absolute pressure.

Gel fractions of the samples, which were determined by extraction in boiling xylene for 48 hours, are shown in Table 7.

TABLE 7

| | Atmosphere in which irradiation is conducted | Tetrafluoroethylene content in the mixture (mole percent) | Gel fraction (percent by wt.) |
|---|---|---|---|
| Non-irradiated | | | 0.0 |
| Examples of the invention. | 1,3-butadiene plus tetrafluoroethylene. | 50.0 | 73.9 |
| | do | 83.3 | 69.0 |
| Comparative examples. | Vacuum | | 0.0 |
| | 1,3-butadiene | 0.0 | 65.9 |
| | Tetrafluoroethylene | 100.0 | 0.0 |

Example 9

A film 0.2 mm. in thickness formed from commercially available high density polyethylene pellets by heating and pressing was placed in the stainless steel reactor and was radiated with gamma rays from the cobalt-60 source at a dose rate of $1 \times 10^5$ rads per hour for 16 hours at 30° C. in the presence of 1,3-butadiene-tetrafluoroethylene mixtures, the tetrafluoroethylene contents of which are shown in Table 8. The pressure of the co-existing gases was 3 kg./cm.² absolute.

For the purpose of comparison, the same polyethylene film was placed in the stainless steel reactor and was irradiated with gamma rays from the cobalt-60 source at the dose rate of $1 \times 10^5$ rads per hour for 16 hours at 30° C. in vacuum of $10^{-4}$ mm. Hg or in the presence of gaseous chlorofluoroethylene or 1,3-butadiene under 3 kg./cm.² pressure (absolute).

The irradiated samples were soaked in boiling xylene for 48 hours for extraction. The percentages of the insoluble portions are given in Table 8.

The following things are learned from Table 8. Gelation of polyethylene is promoted by irradiation in the presence of 1,3-butadiene only. However, the gelation is far more promoted in the presence of both 1,3-butadiene and chlorotrifluoroethylene. When the chlorotrifluoroethylene content of the coexisting gaseous mixture increases, the gelation is promoted. But if the content exceeds a certain limit, the gel fraction is lowered; that is, there is some optimum concentration.

TABLE 8

| | Atmosphere under which irradiation is conducted | Chlorotrifluoroethylene content (mole percent) | Gel fraction (percent by wt.) |
|---|---|---|---|
| Non-irradiated | | | 0.0 |
| Examples of the invention. | Chlorotrifluoroethylene plus 1,3-butadiene. | 16.6 | 30.0 |
| | do | 50.0 | 40.1 |
| | do | 83.4 | 65.9 |
| | do | 93.4 | 63.3 |
| Comparative examples. | Vacuum | | 0.0 |
| | Chlorotrifluoroethylene | 100.0 | 0.0 |
| | 1,3-butadiene | 0.0 | 20.6 |

Example 10

A film 0.2 mm. in thickness formed from commercially available polypropylene pellets by heating and pressing was placed in the stainless steel reactor and was irradiated with 4.8 megarads of gamma rays from the cobalt-60 source at room temperature in the presence of 1,3-butadiene and chlorotrifluoroethylene mixtures, the chlorotrifluoroethylene contents of which are listed in Table 9.

For the purpose of comparison, irradiation as described in Example 9 was repeated in vacuum of $10^{-4}$ mm. Hg and in the presence of chlorotrifluoroethylene or 1,3-butadiene of atmospheric pressure. The irradiated samples were tested in the same way as described in Example 9 for determining their gel fraction. The results are shown in Table 9.

It is apparent that gel fraction of polypropylene is remarkably increased by gamma rays irradiation in the presence of chlorotrifluoroethylene-1,3-butadiene mixture, although it is improved by irradiation in the presence of 1,3-butadiene only.

TABLE 9

| | | Chlorotrifluoroethylene content (mole percent) | Gel fraction (percent by wt.) |
|---|---|---|---|
| Non-irradiated | | | 0.0 |
| Examples | Chlorotrifluoroethylene plus 1,3-butadiene. | 16.6 | 72.2 |
| | do | 50.0 | 79.7 |
| Comparative examples. | Vacuum | | 0.0 |
| | Chlorotrifluoroethylene | 100.0 | 0.0 |
| | 1,3-butadiene | 0.0 | 62.4 |

Example 11

A film 0.2 mm. in thickness formed from commercially available high density polyethylene pellets by heating and pressing was placed in the stainless steel reactor and was irradiated with gamma rays from the cobalt-60 source at a dose rate of $9.58 \times 10^4$ rads per hour for 16 hours at 30° C. in the presence of acetylene-chlorotrifluoroethylene mixtures, the chlorotrifluoroethylene contents of which are listed in Table 9. The pressure of the gaseous mixture was 3 kg./cm.² absolute.

For the purpose of comparison, the same polyethylene film was placed in the reactor and was irradiated with the same gamma rays at the dose rate of $9.58 \times 10^4$ rads per hour for 16 hours at 30° C. in vacuum of $10^{-4}$ mm. Hg, in the presence of acetylene or chlorotrifluoroethylene of 3 kg./cm.² in absolute pressure.

The irradiated samples were soaked in boiling xylene for determining gel fractions thereof. The results are shown in Table 10.

It is apparent from the table that gelation of polyethylene is remarkably promoted when it is irradiated in the presence of acetylene and chlorotrifluoroethylene, although it is promoted by irradiation in the presence of acetylene only. Further it is learned that with increase in chlorotrifluoroethylene content in the gaseous mixture, gel fraction increases, but it decreases again when the chlorotrifluoroethylene content is raised over a certain limit. That is, there is some optimum concentration or mixing ratio.

TABLE 10

| | | Chlorotrifluoroethylene content (mole percent) | Gel fraction (percent by wt.) |
|---|---|---|---|
| Non-irradiated | | | 0.0 |
| Examples | Chlorotrifluoroethylene plus acetylene. | 16.7 | 66.7 |
| | do | 50.0 | 76.9 |
| | do | 83.3 | 66.1 |
| Comparative examples. | Vacuum | | 0.0 |
| | Chlorotrifluoroethylene | 100.0 | 0.0 |
| | Acetylene | 0.0 | 41.5 |

Example 12

A commercially available high density polyethylene sheet 1 mm. in thickness was placed in the stainless steel reactor and was irradiated with 1.1 megarads of gamma rays from the cobalt-60 source at room temperature in the presence of equimolar gaseous mixture of acetylene and chlorotrifluoroethylene.

For the purpose of comparison, the same irradiation was carried out in the presence of acetylene which was recognized to be effective for promotion of gelation.

The irradiated samples were tested as in the foregoing examples for determining gel fraction. The results are shown in Table 11. The table also includes the results of tensile tests carried out with respect to these samples at 80° C. and 130° C.

Table 11 shows that polyethylene irradiated in the presence of acetylene has improved tensile strength, but that the tensile strength of polyethylene irradiated in the presence of acetylene-chlorotrifluoroethylene mixture is much more improved.

TABLE 11

| | | | Tensile tests (kg./cm.²) at— | | | |
|---|---|---|---|---|---|---|
| | | | 80° C. | | 130° C. | |
| | Atmosphere in which irradiation is conducted | Gel fraction (percent by wt.) | Yielding point stress | Breaking point stress | Yielding point stress | Breaking point stress |
| Non-irradiated | | 0.0 | 95.4 | 101.8 | 0.0 | 0.0 |
| Example of the invention | Chlorotrifluoroethylene plus acetylene | 72.0 | 103.0 | 117.6 | 5.8 | 12.6 |
| Comparative example | Acetylene | 42.5 | 95.8 | 102.2 | 2.5 | 9.8 |

What we claim is:

1. A process for crosslinking a polyolefin which comprises irradiating said polyolefin with ionizing radiation in an atmosphere of a gaseous mixture consisting essentially of 16.7–99 mole percent of a fluorine-containing ethylenically unsaturated monomer with the remainder acetylene at a pressure of 1 to 3 atmospheres wherein the total dose of radiation is $10^2$–$10^9$ roentgens.

2. The process in accordance with claim 1 wherein said fluorine-containing monomer is tetrafluoroethylene.

3. The process in accordance with claim 1 wherein said fluorine-containing monomer is chlorotrifluoroethylene.

4. The process in accordance with claim 1 wherein said ionizing radiation is a member selected from the group consisting of gamma-rays, X-rays and accelerated electron rays.

5. The process in accordance with claim 1 wherein said polyolefin is a member selected from the group consisting of polyethylene, chlorinated polyethylene and polypropylene.

6. The process in accordance with claim 1 wherein said fluorine-containing monomer is tetrafluoroethylene, while said polyolefin is polyethylene.

7. The process in accordance with claim 6 wherein said ionizing radiation is gamma-rays.

8. The process in accordance with claim 1 wherein said fluorine-containing monomer is chlorotrifluoroethylene, while said polyolefin is polyethylene.

9. The process in accordance with claim 8 wherein said ionizing radiation is gamma-rays.

10. The polyolefin reformed by crosslinkings caused therein in accordance with the process described in claim 1.

11. The polyolefin reformed by crosslinkings caused therein in accordance with the process described in claim 2.

12. The polyolefin reformed by crosslinkings caused therein in accordance with the process described in claim 3.

13. The polyolefin reformed by crosslinkings caused therein in accordance with the process described in claim 4.

14. The polyolefin reformed by crosslinkings caused therein in accordance with the process described in claim 5.

15. The polyethylene reformed by crosslinkings caused therein in accordance with the process described in claim 6.

16. The polyethylene reformed by crosslinkings caused therein in accordance with the process described in claim 7.

17. The polyethylene reformed by crosslinkings caused therein in accordance with the process described in claim 8.

18. The polyethylene reformed by crosslinkings caused therein in accordance with the process described in claim 9.

References Cited

UNITED STATES PATENTS 3,414,498   12/1968   Shinohara et al. ____ 204—159 B

MURRAY TILLMAN, Primary Examiner

R. B. TURER, Assistant Examiner

U.S. Cl. X.R.

204—159.15; 260—2.5 HA, 878, 879, 884